United States Patent
Golini et al.

(10) Patent No.: US 9,181,383 B2
(45) Date of Patent: Nov. 10, 2015

(54) POLYISOCYANURATE COMPOSITION

(75) Inventors: Paolo Golini, Reggio Emilia (IT); Kai-Sheng Bian, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 247 days.

(21) Appl. No.: 13/810,285

(22) PCT Filed: Aug. 13, 2010

(86) PCT No.: PCT/CN2010/075970
§ 371 (c)(1),
(2), (4) Date: Jan. 15, 2013

(87) PCT Pub. No.: WO2012/019358
PCT Pub. Date: Feb. 16, 2012

(65) Prior Publication Data
US 2013/0137791 A1  May 30, 2013

(51) Int. Cl.
| | | |
|---|---|---|
| *C08G 18/28* | (2006.01) | |
| *C08G 18/09* | (2006.01) | |
| *C08G 18/18* | (2006.01) | |
| *C08G 18/22* | (2006.01) | |
| *C08G 18/40* | (2006.01) | |
| *C08G 18/42* | (2006.01) | |
| *C08G 18/48* | (2006.01) | |
| C08G 101/00 | (2006.01) | |
| C08K 5/53 | (2006.01) | |

(52) U.S. Cl.
CPC .............. *C08G 18/28* (2013.01); *C08G 18/092* (2013.01); *C08G 18/1808* (2013.01); *C08G 18/225* (2013.01); *C08G 18/4018* (2013.01); *C08G 18/4211* (2013.01); *C08G 18/4213* (2013.01); *C08G 18/4829* (2013.01); *C08G 2101/005* (2013.01); *C08G 2101/0025* (2013.01); *C08G 2105/02* (2013.01); *C08K 5/53* (2013.01)

(58) Field of Classification Search
CPC .............................. C08G 18/14; C08G 18/341
USPC .......................................................... 521/157
See application file for complete search history.

(56) References Cited

U.S. PATENT DOCUMENTS

| | | | |
|---|---|---|---|
| 3,951,717 A * | 4/1976 | Herweg et al. ................... | 156/79 |
| 4,410,641 A | 10/1983 | Narayan et al. | |
| 5,318,997 A | 6/1994 | Okada et al. | |
| 6,359,022 B1 | 3/2002 | Hickey et al. | |
| 6,808,800 B2 | 10/2004 | Tomasi | |
| 2001/0003758 A1 | 6/2001 | Bonapersona et al. | |
| 2002/0120029 A1 | 8/2002 | Dohmoto et al. | |
| 2004/0006997 A1 | 1/2004 | Clark et al. | |
| 2006/0047011 A1 | 3/2006 | Kusan-Bindels et al. | |
| 2010/0116829 A1 | 5/2010 | Van Der Wal et al. | |
| 2012/0123009 A1* | 5/2012 | Nefzger et al. ............... | 521/172 |

FOREIGN PATENT DOCUMENTS

| | | |
|---|---|---|
| EP | 389011 A1 | 9/1990 |
| EP | 464204 A1 | 1/1992 |
| EP | 1159341 A1 | 12/2001 |
| EP | 1721919 A1 | 11/2006 |
| EP | 1770118 A1 | 4/2007 |
| JP | 2000-80141 | 3/2000 |
| WO | 2010088198 A1 | 8/2010 |

OTHER PUBLICATIONS

PCT/CN2010/075970; International Search Report Written Opinion of the International Searching Authority.
PCT/ CN2010/075970, International Preliminary Report on Patentability.

* cited by examiner

*Primary Examiner* — Randy Gulakowski
*Assistant Examiner* — Christina Wales

(57) ABSTRACT

Polyisocyanurate foam composition, articles comprising the composition and a method of making the composition are described. The polyisocyanurate foam composition comprises the reaction product of a polyisocyanate compound; and a first polyester polyol comprising the residue of orthophthalic acid; a second polyester polyol comprising the residue of terephthalic acid; at least one polyether polyol having a functionality of at least 3 and a hydroxyl number greater than 200; and a physical blowing agent, wherein the isocyanate index is greater than 250.

5 Claims, No Drawings

POLYISOCYANURATE COMPOSITION

The present invention relates to a polyisocyanurate foam composition, an article comprising the composition and a method of making the composition.

Polyisocyanurates find use in a number of different areas. In particular, a polyisocyanurate has good heat-insulating properties and flame retardancy, and therefore commonly finds use in heat insulating materials and building panels. One particular method of forming panels is double belt lamination, in which a polyisocyanurate foam composition is applied to a plate. When producing these panels, the polyisocyanurate typically suffers from having unacceptable shrinkage and also wave patterns forming on the surface.

EP1770118 describes a polyisocyanurate foam in which the foam is produced from a reaction of a polyester polyol having a hydroxyl value of 70 to 150 and a polyester polyol having a hydroxyl value of 200 to 300 with a polyisocyanate compound at an isocyanate index of 200 to 300. The Examples use only terephthalic acid as the acid in the polyester polyols.

WO00/61654 discloses a polyol resin blend in which an aromatic polyester polyol and a polyether polyol are used. The polyester polyol is based on phthalic acid. Phthalic anhydride is used in the Examples.

Accordingly, it is an aim of the present invention to provide new polyisocyanurate compositions which can be formed into articles such as sheets which do not suffer from the problems of the prior art compositions, including problems with shrinkage and the formation of wave patterns on the surface of the article.

In a first aspect of the present invention, there is provided polyisocyanurate foam composition comprising the reaction product of:
a) a polyisocyanate compound; and
b)1) a first polyester polyol comprising the residue of orthophthalic acid;
b)2) a second polyester polyol comprising the residue of terephthalic acid;
b)3) at least one polyether polyol having a functionality of at least 3 and a hydroxyl number greater than 200; and
c) a physical blowing agent,
wherein the isocyanate index is greater than 250

In a second aspect of the present invention, there is provided an article comprising the composition of the first aspect. Suitable articles include foam panels with a rigid or flexible backing formed from metal, coated paper, plaster board, polyester or the like. Panels with two facing sheets can also be provided.

In a third aspect of the present invention, there is provided a method of producing a panel having a facing and a polyisocyanurate foam block, comprising the steps of:
applying a reaction mixture comprising:
a) a polyisocyanate compound; and
b)1) a first polyester polyol comprising the residue of orthophthalic acid;
b)2) a second polyester polyol comprising the residue of terephthalic acid;
b)3) at least one polyether polyol having a functionality of at least 3 and a hydroxyl number greater than 200; and
c) a physical blowing agent
wherein the isocyanate index is greater than 250,
to the facing using double belt lamination.

It is an important feature of the present invention that the isocyanate-reactive components include a polyester containing residues of orthophthalic acid and a polyester containing residues of terephthalic acid.

The first polyester polyol contains the residue of orthophthalic acid. The polyester polyol preferably has a hydroxyl value of greater than 200. It is further preferred that the hydroxyl value is from 200 to 400, more preferably 200 to 300.

The first polyester polyol preferably has a functionality of at least 2, preferably from 2 to 8, and more preferably from 2 to 4. It is particularly preferred that the first polyester polyol has a functionality of 2.

The first polyester polyol is formed from the reaction of orthophthalic acid, phthalic anhydride or any other analogue which forms a residue of orthophthalic acid in the polyester polyol with at least one di- or polyfunctional alcohol. Suitable polyols include ethylene glycol, diethylene glycol, triethylene glycol, propylene glycol, dipropylene glycol, butanediol, pentane diol, neopentyl glycol, hexanediol, cyclohexanedimethanol, bisphenol A, bisphenol F, bisphenol S, trimethylolpropane, glycerine, pentaerythritol, sorbitol, or saccharides.

It is further preferred that these polyester polyols are polymerized with one or more alkylene oxides. Preferably, the alkylene oxides are ethylene oxide and/or propylene oxide.

In the first polyester polyol, the orthophthalic acid residue is the only acid residue present.

The second polyester polyol contains the residue of terephthalic acid. The polyester polyol preferably has a hydroxyl value of less than 250. It is further preferred that the hydroxyl value is from 100 to 250, more preferably greater than 160 to 230.

The second polyester polyol preferably has a functionality of at least 2, preferably from 2 to 8, and more preferably from 2 to 4. It is particularly preferred that the second polyester polyol has a functionality of 2.

The second polyester polyol is formed from the reaction of terephthalic acid or any analogue which forms a residue of terephthalic acid in the polyester polyol with at least one di- or polyfunctional alcohol. Suitable polyols include ethylene glycol, diethylene glycol, triethylene glycol, propylene glycol, dipropylene glycol, butanediol, pentane diol, neopentyl glycol, hexanediol, cyclohexanedimethanol, bisphenol A, bisphenol F, bisphenol S, trimethylolpropane, glycerine, pentaerythritol, sorbitol, or saccharides. The terephthalic acid residue is the only acid residue present.

It is further preferred that these polyester polyols are polymerized with one or more alkylene oxides. Preferably, the alkylene oxides are ethylene oxide and/or propylene oxide.

Optionally, at least a third polyester polyol may be present. The third polyester polyol is preferably an aromatic polyester polyol. A suitable third polyester polyol is a polyester polyol containing the residue of orthophthalic acid, although other polyester polyols can be used. The third polyester polyol preferably has a hydroxyl value of less than 250. It is further preferred that the hydroxyl value is from 100 to 250 and more preferably from 120 to 200. The third polyester polyol preferably has a functionality of 2 or greater.

It is preferred that the total amount of polyester polyol is from 30 to 80 weight percent, based on the total amount of components in the reaction mixture excluding isocyanate. More preferably, the total amount of polyester polyol is from 40 to 60 weight percent.

The first polyester polyol is preferably from 10 to 70% by weight based on the total amount of components in the reaction mixture excluding isocyanate, more preferably from 15 to 40 weight percent and most preferably from 18 to 35 weight percent.

The second polyester polyol is preferably from 6 to 70% by weight based on the total amount of components in the reaction mixture excluding isocyanate, preferably from 8 to 40 weight percent.

The third polyester polyol, where present, is preferably present in an amount of up to 30% by weight based on the total amount of components in the reaction mixture excluding isocyanate. Preferably, the third polyester polyol is present in an amount of up to 20% by weight.

In one preferred embodiment, the second and third polyester polyols are present as a mixture. It is preferred that the hydroxyl value of this mixture is less than 250, preferably from 100 to 200. Where a mixture of second and third polyester polyols is added, it is preferred that the second polyester polyol is at least 25 weight percent of the mixture of second and third polyesters. More preferably, the second polyester polyol is from 35 to 75 weight percent of the mixture of second and third polyester polyols.

Each of the first, second and third polyester polyols can comprise a mixture of more than one polyester polyol.

In a preferred embodiment, the polyester mixture consists of one or more of the first polyester polyol, one or more of the second polyester polyol and optionally one or more third aromatic polyester polyol, preferably containing a residue of orthophthalic acid.

At least one polyether polyol having a functionality of at least 3 and a hydroxyl number greater than 200 is additionally present. It is preferred that the polyether polyol has a functionality of from 4 to 8. The polyether polyol can be aromatic or aliphatic, although it is preferred that the polyether polyol is aliphatic.

The hydroxyl number of the polyether polyols is preferably from 200 to 850 mg KOH/g, more preferably from 250 to 500 mg KOH/g.

The polyether polyol can be produced by any known method. Typically, the polyether polyol is formed by reaction of a starter material with one or more alkylene oxides. Preferred alkylene oxides include ethylene oxide, propylene oxide and butylene oxide.

The alkylene oxides can be added randomly or in blocks. Particularly preferred are ethylene oxide/propylene oxide copolymers, with a block copolymer of ethylene oxide and propylene oxide being particularly preferred.

Suitable starter molecules are any which will produce the required functionality, such as pentaerythritol, sucrose or sorbitol. These can be used in combination with other starter molecules having lower functionality, such as ethylene glycol or glycerol, so long as the functionality of the resultant mixture of polyether polyols is greater than 3 and preferably from 4 to 8.

However, it is particularly preferred that all of the polyether polyols present in the composition have a functionality of at least 3.

The polyether polyol is preferably present in an amount of from 10 to 30 weight percent, based on the total amount of components in the reaction mixture excluding isocyanate. Preferably, the polyether polyol is present in an amount of from 10 to 20 weight percent, and more preferably 10 to 15 weight percent.

As the polyisocyanate compound, it is possible to use any standard organic diisocyanates and polyisocyanates. It is preferred that aliphatic, cycloaliphatic or aromatic diisocyanates and/or polyisocyanates are used. It is further preferred that an aromatic diisocyanate or polyisocyanate is used. It is most preferred to use tolylene diisocyanate (TDI), diphenylmethane diisocyanate (MDI), or polymeric MDI (mixtures of diphenylmethane diisocyanate and polyphenylene-polymethylene polyisocyanates), with polymeric MDI being particularly preferred.

The isocyanates can also be modified, for example by incorporation of uretdione, carbamate, isocyanurate, carbodiimide, allophanate or particular urethane groups.

The isocyanate index, based on the polyisocyanate, the polyols and water, is at least 250, preferably greater than or equal to 300 and more preferably greater than 300. The index is preferably less than 500, more preferably less than 400.

Preferably, a trimerisation catalyst is used to promote formation of the isocyanurate groups. Any suitable catalyst can be used. Preferred trimerisation catalysts include potassium acetate and potassium octoate.

The metal salt trimerisation catalyst is generally used in an amount ranging from 0.5 to 5 weight percent, preferably about 1 to 3 weight percent, based on the total amount of components in the reaction mixture excluding isocyanate.

In addition to a metal salt trimerisation catalyst, other types of trimerisation catalysts and urethane catalysts can be used. Examples of these additional catalysts include dimethylcyclohexylamine, triethylamine, pentamethylenediethylenetriamine, tris (dimethylamino-propyl)hydrotriazine, dimethylbenzylamine and mixtures thereof. They are used in amounts ranging from 0.1 to 8% by weight based on the total amount of components in the reaction mixture excluding isocyanate. In general the total amount of trimerisation catalyst is between 0.4 and 4.5% and the total amount of urethane catalyst ranges from 0.1 to 3.5% by weight based on the total amount of components in the reaction mixture excluding isocyanate.

It is essential that a physical blowing agent is used in the formation of the polyisocyanurate to produce a polyisocyanurate foam. The blowing agent can include physical blowing agents and/or chemical blowing agents Suitable physical blowing agents include hydrocarbons, halogen-containing hydrocarbons, particularly hydrofluorocarbons and hydrochlorofluorocarbons.

Examples of suitable hydrochlorofluorocarbons include 1-chloro-1,2-difluoroethane, 1-chloro-2,2-difluoroethane, 1-chloro-1,1-difluoroethane, 1,1-dichloro-1-fluoroethane, monochlorodifluoromethane and mixtures thereof 1,1-dichloro-1-fluoroethane is particularly preferred.

Examples of suitable hydrofluorocarbons include 1,1,1,2-tetrafluoroethane (HFC 134a), 1,1,2,2-tetrafluoroethane, trifluoromethane, heptafluoropropane, 1,1,1-trifluoroethane, 1,1,2-trifluoroethane, 1,1,1,2,2-pentafluoropropane, 1,1,1,3-tetrafluoropropane, 1, 1, 1,3,3-pentafluoropropane (HFC 245fa), 1,1,3,3,3-pentafluoropropane, 1,1,1,3,3-pentafluoro-n-butane (HFC 365mfc), 1,1,1,4,4,4-hexafluoro-n-butane, 1,1,1,2,3,3,3-heptafluoropropane (HFC 227ea) and mixtures of any of the above.

Suitable hydrocarbon blowing agents include lower aliphatic or cyclic, linear or branched hydrocarbons such as alkanes, alkenes and cycloalkanes, preferably having from 4 to 8 carbon atoms. Specific examples include n-butane, isobutane, 2,3-dimethylbutane, cyclobutane, n-pentane, isopentane, technical grade pentane mixtures, cyclopentane, methylcyclopentane, neopentane, n-hexane, iso-hexane, n-heptane, iso-heptane, cyclohexane, methylcyclohexane, 1-pentene, 2-methylbutene, 3-methylbutene, 1-hexene and any mixture of the above.

Water or other carbon dioxide-evolving compounds are preferably used together with the physical blowing agents. Where water is used as chemical blowing agent typical amounts are in the range from 0.2 to 3 weight percent, preferably from 0.5 to 1.5 weight percent based on the total amount of components in the reaction mixture excluding isocyanate.

The total quantity of blowing agent to be used in a reaction system for producing cellular polymeric materials will be readily determined by those skilled in the art, but will typically be from 10 to 25 weight percent based on the total amount of components in the reaction mixture excluding isocyanate.

Preferred blowing agents are water and/or hydrocarbons and/or hydrofluorocarbons.

Any suitable flame retardant can be used. Suitable flame retardants include phosphorous containing flame retardants, which optionally include halogens. Preferred Examples include trichloropropyl phosphate, triethylphosphate or diethyl ethyl phosphonate.

The flame retardants are preferably used in amounts of from 0 to 40 weight percent, based on the total weight of components in the reaction mixture excluding isocyanate. Preferably, the flame retardant is present in an amount of from 10 to 30 weight percent, and more preferably from 10 to 20 weight percent.

The reaction mixture will commonly contain one or more other auxiliaries or additives conventional to formulations for the production of polyisocyanurates. Such optional additives include crosslinking agents, for examples low molecular weight polyols such as triethanolamine, surfactants, and fillers such as carbon black. Amounts of additives, where present, are generally in the range 1 to 10% by weight based on the total weight of components in the reaction mixture excluding isocyanate, preferably about 2% to 6%.

The polyisocyanurate composition is a polyisocyanurate foam. The foam preferably has a density in the range of 20 to 200 kg/m$^3$, preferably from 30 to 100 kg/m$^3$, more preferably from 40 to 60 kg/m$^3$.

The polyisocyanurate composition typically has good flame resistant properties. When the fire behaviour is measured according to DIN4102, the flame height is less than 9 cm.

The polyisocyanurate composition is preferably formed into an article. The article is preferably a foam board. The foam board can be produced for example by a continuous double belt lamination process in which the polyisocyanurate is applied to a base layer which can be formed of a metal or resin or other material. Suitable metals include aluminium or steel. Suitable resins include polyesters and suitable other materials include plaster board or coated paper. The board can be either flexible or rigid depending on the backing used. A preferred foam board panel of this kind typically has a foam thickness of 30 to 200 mm.

The features of one embodiment of the present invention can be combined with one or more of the features of any of the other embodiments.

The foams according to the present invention have the advantageous properties of excellent flame resistance and small shrinkage rate, as well as maintaining or improving the other properties of a foam such as curing rate, compressive strength, and dimensional stability in all directions.

EXAMPLES

The invention will now be further described with reference to the following Examples. The Examples were made using the following components.

TABLE 1

| Component | Trade Name | Description | Supplier |
|---|---|---|---|
| Polyester polyol 1 | Stepanol PS-2352 | aromatic polyester polyol 100% ortho; functionality (f) = 2, OH no 230 | Stepan |
| Polyester polyol 2 | Stepanol PS-1922 | aromatic polyester polyol; f = 2, OH no 190. Orthophthalate/terephthalate isomer ratio: 62/38 | Stepan |
| Polyester polyol 3 | Terate 7541L | aromatic polyester polyol from dimethyl terephthalate; f = 2, OH no 200 | Invista |
| Polyether polyol 1 | Voranol 280 | polyether polyol from sucrose; f = 6.9, OH no 280 | Dow |
| Polyether polyol 2 | PEG 400 | polyethylene glycol; f = 2, OH no 280 | Dow |
| Polyether polyol 3 | Tercarol 5902 | polyether polyol from o-toluene diamine; f = 4; OH no 390 | Dow |
| Polyether polyol 4 | Voranol CP-1421 | glycerol initiated polyether polyol; f = 3, OH no 35 | Dow |
| Flame retardant 1 | TCPP | trichloroisopropyl phosphate | Yako |
| Flame retardant 2 | TEP | Triethylphosphate | Quimidroga |
| Flame retardant 3 | DEEP | diethyl ethyl phosphonate | Quimidroga |
| Catalyst 1 | K-2097 | potassium acetate in diethylene glycol | Air Products |
| Catalyst 2 | K-15 | potassium octoate in diethylene glycol | Air Products |
| Catalyst 3 | PC-5 | N,N,N,N,N-pentamethyldiethylenetriamine | Air Products |
| Catalyst 4 | Polycat 8 | dimethylcyclohexyl amine | Air Products |
| Surfactant 1 | DC-193 | silicone surfactant | Air Products |
| Surfactant 2 | DC-5598 | silicone surfactant | Air Products |
| Surfactant 3 | Empilan NP-9 | ethoxylated nonylphenol | Quimidroga |
| Blowing Agent | HCFC 141-b | 1,1-dichloro-1-fluoroethane | Sanmei, Zhejiang |
| Isocyanate | Voranate M-220 | Polymeric MDI, isocyanate content = 31%; f = 2.7 | Dow |

The components were mixed in the amounts set out in Table 2. All of the components except for the isocyanate were mixed together by means of a mixer at about 1500 rpm. The isocyanate was then added at an average isocyanate index of 350.

strength value is expressed in kPa and allows a comparison of the rate of cure of the produced rigid polyisocyanurate foams.

Compressive strength is determined on 5×5×5 cm samples cut from free rise produced foam according to UNI6350. Compression at constant speed (10 mm/min) applied in different directions: parallel to foam rise and perpendicular to rise. 10 kN Instron equipment is used.

TABLE 2

|  | pbw | Example 1 | Example 2 | Comparative Example 1 | Comparative Example 2 | Comparative Example 3 |
| --- | --- | --- | --- | --- | --- | --- |
| Polyester polyol 1 |  | 26.15 | 20.5 | 26.2 | — | 52 |
| Polyester polyol 2 |  | 26.13 | — | 26.15 | — | — |
| Polyester polyol 3 |  | — | 31 | — | 44.8 | — |
| Polyether polyol 1 |  | 13.17 | 14 | — | — | 13 |
| Polyether polyol 2 |  | — | — | 13.1 | — | — |
| Polyether polyol 3 |  | — | — | — | 9.9 | — |
| Polyether polyol 4 |  | — | — | — | 7.0 | 15 |
| Flame retardant 1 |  | 15 | 15 | 15 | 8.7 | — |
| Flame retardant 2 |  | — | — | — | 5.8 | — |
| Flame retardant 3 |  | — | — | — | 4.9 | — |
| Catalyst 1 |  | 1.3 | 1.3 | 1.3 | — | 1.7 |
| Catalyst 2 |  | — | — | — | 1.02 | — |
| Catalyst 3 |  | 0.3 | 0.3 | 0.3 | — | 0.3 |
| Catalyst 4 |  | — | — | — | 0.25 | — |
| Surfactant 1 |  | 2 | 2 | 2 | — | 2 |
| Surfactant 2 |  | — | — | — | 1.45 | — |
| Surfactant 3 |  | — | — | — | 1.95 | — |
| Water |  | 0.55 | 0.55 | 0.55 | 0.72 | 0.6 |
| Blowing Agent |  | 15.4 | 15.4 | 15.4 | 13.6 | 15.4 |
| Total parts by weight (pbw) |  | 100 | 100.05 | 100 | 100.0 | 100 |
| ortho isomer content | % | 81 | 40 | 81 | 0 | 100 |
| para isomer content | % | 19 | 60 | 19 | 100 | 0 |
| Isocyanate |  | 160 | 157 | 160 | 187 | 169 |

The reacting mixture was poured into a 20 cm×20 cm×20 cm wooden box and allowed to form a free rise foam. The foam was removed from the box 2 minutes after reaction. The following results were obtained from the resultant foam.

TABLE 3

| Reactivity |  | Example 1 | Example 2 | Comparative Example 1 | Comparative Example 2 | Comparative Example 3 |
| --- | --- | --- | --- | --- | --- | --- |
| cream time/gel time | sec | 8/45 | 9/44 | 8/42 | 10/48 | 9/50 |
| Free rise density | kg/m$^3$ | 47.4 | 47.9 | 46.9 | 46.5 | 47.8 |
| compressive strength parallel to rise | kPa | 303 | 305 | 291 | 322 | 300 |
| compressive strength perpendicular to rise | kPa | 196 | 181 | 168 | 145 | 187 |
| Curing property: |  |  |  |  |  |  |
| green compressive strength, 4 min | kPa | 143 | 138 | 118 | 110 | 124 |
| dimensional stability, 70° C., 24 h |  |  |  |  |  |  |
| Length | % | 0.24 | 0.18 | 0.4 | −0.7 | −0.2 |
| Width | % | 0.27 | 0.34 | 0.15 | −0.4 | 0.3 |
| Thickness | % | 0.1 | 0.16 | 0.2 | 0.2 | 0.1 |

The green compressive strength is measured by removing the free rise foam 2 minutes after reaction initiation, placing the foam sample (perpendicular to direction of rise) on a 5×5 cm wood base that is held on the lower plate of a 10 kN Instron equipment. The upper Instron plate is moved after 5 minutes from reaction initiation to press the foam at constant speed (20 mm per minute). The obtained green compressive It can be seen from the results that the compositions according to the present invention have excellent rate of curing and compressive strength, and superior dimensional stability in all directions compared with the compositions of the prior art.

Comparative Example 1 does not contain any high functionality polyether polyol and can be seen to have a lower compressive strength and also have a worse green compressive strength.

Comparative Example 2 does not contain any orthophthalic acid residues in the polyester polyols. This Example has inferior green compressive strength and also poor compressive strength perpendicular to rise.

Comparative Example 3 does not contain any terephthalic acid residues in the polyester polyols. This Example has inferior green compressive strength.

It can be seen from the results that in order to provide a composition having better curing rate and good final compressive strength, it is necessary to use the combination of polyester polyols and polyether polyols required by the present invention. The rate of curing controls the final panel properties. By providing improved curing rate, the resultant panels will have reduction in the uneven surface of the foam and a maintained thickness i.e. no or limited shrinkage over the panel surface.

The invention claimed is:

1. A method of producing a panel having a facing and a polyisocyanurate foam block, comprising the steps of: applying a reaction mixture comprising:
   a) a polyisocyanate compound; and
   b)1) a first polyester polyol comprising the residue of orthophthalic acid;
   b)2) a second polyester polyol comprising the residue of terephthalic acid;
   b)3) at least one polyether polyol having a functionality of at least 3 and a hydroxyl number greater than 200, the polyether polyol having a hydroxyl number of 200 to 850 mg KOH/g and comprising from 10 to 30 weight percent of the reaction mixture excluding the polyisocyanate compound; and
   c) a physical blowing agent
   wherein the isocyanate index is greater than 250,
   to the facing using double belt lamination.

2. The method of claim 1 wherein the first polyester polyol has a hydroxyl number of 200 to 400 mg KOH/g and comprises from 10 to 70 weight percent of the reaction mixture excluding the polyisocyanate compound.

3. The method of claim 1 wherein the second polyester polyol has a hydroxyl number of 100 to less than 250 mg KOH/g and comprises from 6 to 70 weight percent of the reaction mixture excluding the polyisocyanate compound.

4. The method of claim 1 wherein the isocyanate index is from greater than 250 to less than 500.

5. The method of claim 1 wherein:
   the first polyester polyol has a hydroxyl number of 200 to 400 mg KOH/g and comprises from 10 to 70 weight percent of the reaction mixture excluding the polyisocyanate compound; and
   the second polyester polyol has a hydroxyl number of 100 to 250 mg KOH/g and comprises from 6 to 70 weight percent of the reaction mixture excluding the polyisocyanate compound.

* * * * *